United States Patent [19]
Kim

[11] Patent Number: 6,158,425
[45] Date of Patent: Dec. 12, 2000

[54] PORTABLE CHARCOAL-FIRED ROASTER

[75] Inventor: Tae Myoung Kim, Seoul, Rep. of Korea

[73] Assignee: K.M. Carbon Co., Ltd., Seoul, Rep. of Korea

[21] Appl. No.: 09/543,409

[22] Filed: Apr. 5, 2000

[30] Foreign Application Priority Data

Mar. 23, 2000 [KR] Rep. of Korea ..................... 10-14722

[51] Int. Cl.$^7$ ..................................................... F24C 1/16
[52] U.S. Cl. ...................... 126/9 A; 126/25 R; 126/25 B
[58] Field of Search .................................. 126/9 R, 9 A, 126/9 B, 25 R, 25 B, 29, 30

[56] References Cited

U.S. PATENT DOCUMENTS

| | | | |
|---|---|---|---|
| 3,684,087 | 8/1972 | Anderson | 126/9 A |
| 4,531,506 | 7/1985 | Chambers et al. | 129/25 R |
| 4,782,812 | 11/1988 | Kellerman | 126/9 A |
| 5,638,743 | 6/1997 | Lo | 126/9 A |
| 5,785,045 | 7/1998 | Chen | 126/9 A |

*Primary Examiner*—James C. Yeung

[57] ABSTRACT

A portable charcoal-fired roaster including a housing defined with an internal space having an increased cross-sectional area as it extends upwardly, the housing having a bending flange at an upper end thereof, an inner support net seated on the bottom of the housing and adapted to provide a seat for charcoal blocks to be received in the housing in such a fashion that it supports the charcoal blocks in a state suspended from the bottom of the housing, the inner support net having an inverted U-shaped structure to define a space between the bottom of the housing and the top of the inner support net for receiving an ignition material, a plurality of charcoal retaining nets seated on the charcoal blocks laid on the inner support net to retain the charcoal blocks in such a fashion that the charcoal blocks are grouped into charcoal block groups spaced apart from one another and respectively retained by the charcoal retaining nets, each of the charcoal retain nets having a central upward protrusion with an inverted U-shaped structure, and a gridiron seated on the charcoal retaining nets in such a fashion that it is in elastic contact with respective upper surfaces of the upward protrusions provided at the charcoal retaining nets, the gridiron being retained in position by the bending flange of the housing.

3 Claims, 10 Drawing Sheets

PORTABLE CHARCOAL-FIRED ROASTER

BACKGROUND OF THE INVENTION

1. Field of the Invention

The present invention relates to a portable charcoal-fired roaster, and more particularly to a portable charcoal-fired roaster including at least one inner support net and a plurality of spaced charcoal retaining nets to retain charcoal blocks therebetween while having an elastic contact structure capable of firmly coupling those inner support net and charcoal retaining nets without using any separate coupling means.

2. Description of the Prior Art

Referring to FIGS. 1 and 2, a conventional portable charcoal-fired roaster is illustrated, respectively. As shown in FIGS. 1 and 2, the charcoal-fired roaster includes a housing 2 having a bottom wall and an inclined side wall 1 extending upwardly from the peripheral edge of the bottom wall in such a fashion that the housing 2 has an increased cross-sectional area as it extends upwardly, and an inner support net 10 received in the housing 2 and adapted to support charcoal blocks 4 received in the housing 2. The inner support net 10 has a bottom support net 10a seated on the bottom of the housing 2 and adapted to provide a seat for the charcoal blocks 4 received in the housing 2 to support the charcoal blocks 4 in a state suspended from the bottom of the housing 2, and a side wall support net 10b supported by the inner surface of the side wall 1 of the housing 2. The charcoal-fired roaster also includes a charcoal retaining net 5 seated on the charcoal blocks 4 and adapted to cover the charcoal blocks 4 seated on the bottom support net 10a, and a gridiron 3 seated on the upper end of the side wall support net 10b. The side wall support net 10b extends upwardly to the upper end of the housing 2 so that the gridiron 3 seated on the upper end of the side wall support net 10b is maintained in a state suspended from the charcoal retaining net 5. A bending flange is formed at the upper end of the side wall 1 of the housing 2. In a state in which the gridiron 3 is seated on the upper end of the side wall support net 10b, the bending flange is inwardly bent to cover the peripheral edge of the gridiron 3, thereby retaining the gridiron 3 in position. An ignition material 12, which allows the charcoal blocks 4 to catch fire, is placed at a space defined between the bottom of the housing 2 and the upper surface of the bottom support net 10a. The charcoal retaining net 5 and inner support net 10 are coupled to each other by means of coupling members (not shown). In FIG. 1, the reference numeral 6 denotes a cut-out formed at a desired portion of the side wall of the housing 2 to provide an opening for allowing flames to have access to the ignition material 12, thereby allowing the ignition material 12 to catch fire.

The sidewall support net 10b of the inner support net 10 is supported by the inclined side wall 1 of the housing 2 in the above mentioned charcoal-fired roaster. However, the sidewall support net 10b may be easily moved from its support position because the side wall 1 of the housing 2 is made of a material exhibiting a flexibility. For this reason, it may be difficult to put the ignition material 12 into a desired portion of the housing 2. Furthermore, the charcoal retaining net 5 may also be moved by virtue of the movement of the sidewall support net 10b. This may result in a movement of the charcoal blocks 4. In order to eliminate such problems, coupling members such as coupling wires are used in the conventional charcoal-fired roaster.

SUMMARY OF THE INVENTION

Therefore, an object of the invention is to eliminate the problems involved in the above mentioned conventional portable charcoal-fired roaster, and to provide a portable charcoal-fired roaster capable of coupling charcoal supporting and retaining nets together without using any separate coupling means.

In accordance with one aspect, the present invention provides a portable charcoal-fired roaster comprising: a housing having a bottom wall and an inclined side wall extending upwardly from a peripheral edge of the bottom wall in such a fashion that the housing has a space having an increased cross-sectional area as it extends upwardly, the side wall having a bending flange at an upper end thereof; an inner support net seated on the bottom wall of the housing and adapted to provide a seat for charcoal blocks to be received in the housing in such a fashion that it supports the charcoal blocks in a state suspended from the bottom wall of the housing, the inner support net having an inverted U-shaped structure to define a space between the bottom of the housing and the top of the inner support net for receiving an ignition material; a plurality of charcoal retaining nets seated on the charcoal blocks laid on the inner support net to retain the charcoal blocks in such a fashion that the charcoal blocks are grouped into charcoal block groups spaced apart from one another and respectively retained by the charcoal retaining nets, each of the charcoal retain nets having a central upward protrusion with an inverted U-shaped structure; and a gridiron seated on the charcoal retaining nets in such a fashion that it is in elastic contact with respective upper surfaces of the upward protrusions provided at the charcoal retaining nets, the gridiron being retained in position by the bending flange of the housing.

In accordance with another aspect, the present invention provides a portable charcoal-fired roaster comprising: a housing having a bottom wall and an inclined side wall extending upwardly from a peripheral edge of the bottom wall in such a fashion that the housing has a space having an increased cross-sectional area as it extends upwardly, the side wall having a bending flange at an upper end thereof; a central spacer net centrally seated on the bottom wall of the housing, the central spacer net having an inverted U-shaped structure and extending upwardly to the upper end of the housing; a pair of end spacer nets respectively seated on the bottom wall of the housing at opposite sides of the housing and spaced apart from the central spacer, each of the end spacer nets having a 90°-inverted L-shaped structure and extending upwardly to the upper end of the housing; a pair of inner support nets seated on the bottom wall of the housing at opposite sides of the central spacer net, each of the inner support nets serving to provide a seat for charcoal blocks to be received in the housing in such a fashion that it supports the charcoal blocks in a state suspended from the bottom wall of the housing, each of the inner support nets having an inverted U-shaped structure to define a space between the bottom of the housing and the top of the inner support net for receiving an ignition material; a plurality of charcoal retaining nets seated on the charcoal blocks laid on each of the inner support nets to retain the charcoal blocks in such a fashion that the charcoal blocks are grouped into charcoal block groups spaced apart from one another and respectively retained by the charcoal retaining nets, each of the charcoal retain nets enclosing an associated one of the charcoal block groups and having a central upward protrusion with an inverted U-shaped structure; and a gridiron seated on the charcoal retaining nets in such a fashion that it is in elastic contact with respective upper surfaces of the upward protrusions provided at the charcoal retaining nets and respective upper surfaces of the central and end spacer nets, the gridiron being retained in position by the bending flange of the housing.

In accordance with another aspect, the present invention provides a portable charcoal-fired roaster comprising: a housing having a bottom wall and an inclined side wall extending upwardly from a peripheral edge of the bottom wall in such a fashion that the housing has a space having an increased cross-sectional area as it extends upwardly, the side wall having a bending flange at an upper end thereof; a central spacer net centrally seated on the bottom wall of the housing, the central spacer net having an inverted U-shaped structure and extending upwardly to the upper end of the housing; a pair of end spacer nets respectively seated on the bottom wall of the housing at opposite sides of the housing and spaced apart from the central spacer, each of the end spacer nets having a 90°-inverted L-shaped structure and extending upwardly to the upper end of the housing; a pair of inner support nets seated on the bottom wall of the housing at opposite sides of the central spacer net, each of the inner support nets serving to provide a seat for charcoal blocks to be received in the housing in such a fashion that it supports the charcoal blocks in a state suspended from the bottom wall of the housing, each of the inner support nets having an inverted U-shaped structure to define a space between the bottom of the housing and the top of the inner support net for receiving an ignition material; a pair of charcoal retaining nets each seated on the charcoal blocks laid on an associated one of the inner support nets to retain the charcoal blocks in such a fashion that the charcoal blocks on the associated inner support net are grouped into charcoal block lines spaced apart from one another and retained by the charcoal retaining net, each of the charcoal retain nets, each of the charcoal retaining nets having a plurality of upper support portions each seated on selected ones of the charcoal block lines laid on an associated one of the inner support nets, a pair of lateral support portions extending downwardly from respective opposite lateral ends of those of the upper support portions seated on the outermost ones of the charcoal block lines on the associated inner support net, the lateral support portions being in contact with the outermost charcoal block lines, respectively, a plurality of spacer portions interposed between adjacent ones of the charcoal block lines on the associated inner support net and adapted to space the charcoal block lines from one another, each of the spacer portions having a U-shaped structure extending downwardly below the upper support portions, and a plurality of protrusion arranged over the remaining ones of the charcoal block lines not in contact with the upper support portions, each of the protrusions having an inverted U-shaped structure extending upwardly to the upper end of the housing between adjacent ones of the spacer portions in such a fashion that it encloses the upper portion of an associated one of the charcoal block lines; and a gridiron seated on the charcoal retaining nets in such a fashion that it is in elastic contact with respective upper surfaces of the upward protrusions provided at the charcoal retaining nets and respective upper surfaces of the central and end spacer nets, the gridiron being retained in position by the bending flange of the housing.

BRIEF DESCRIPTION OF THE DRAWINGS

The above objects, and other features and advantages of the present invention will become more apparent after a reading of the following detailed description when taken in conjunction with the drawings, in which.

DESCRIPTION OF THE PREFERRED EMBODIMENTS

Now, a preferred embodiment of the present invention will be described in detail, in conjunction with FIGS. 3 to 6.

Figure 1:
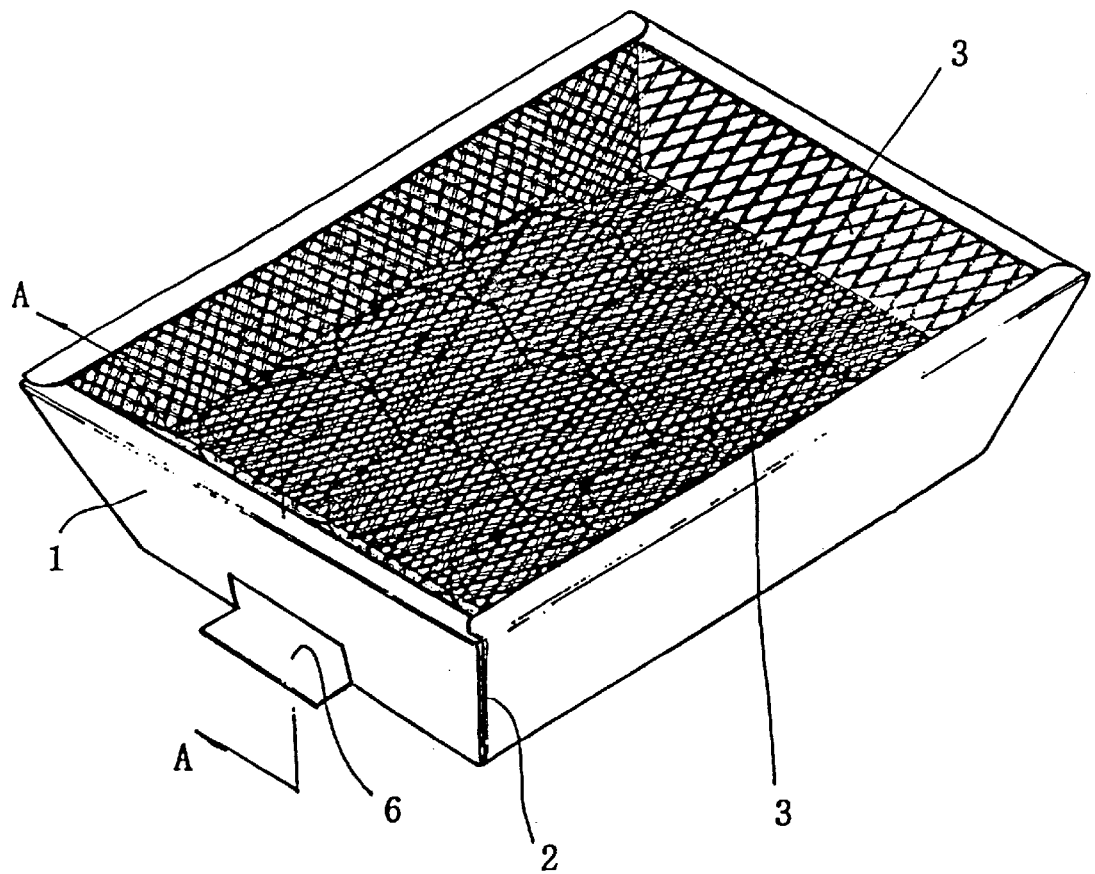
FIG. 1 is a perspective view illustrating a conventional portable charcoal-fired roaster.
Figure 2:
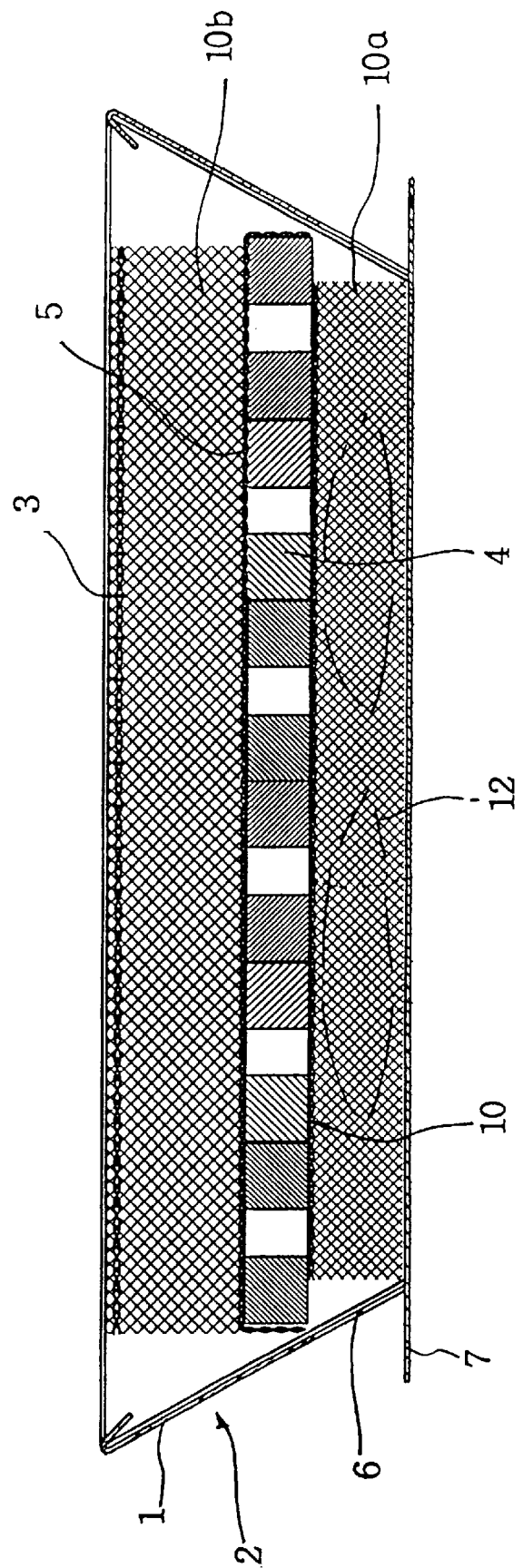
FIG. 2 is a cross-sectional view taken along the line A—A of FIG. 1.
Figure 3:
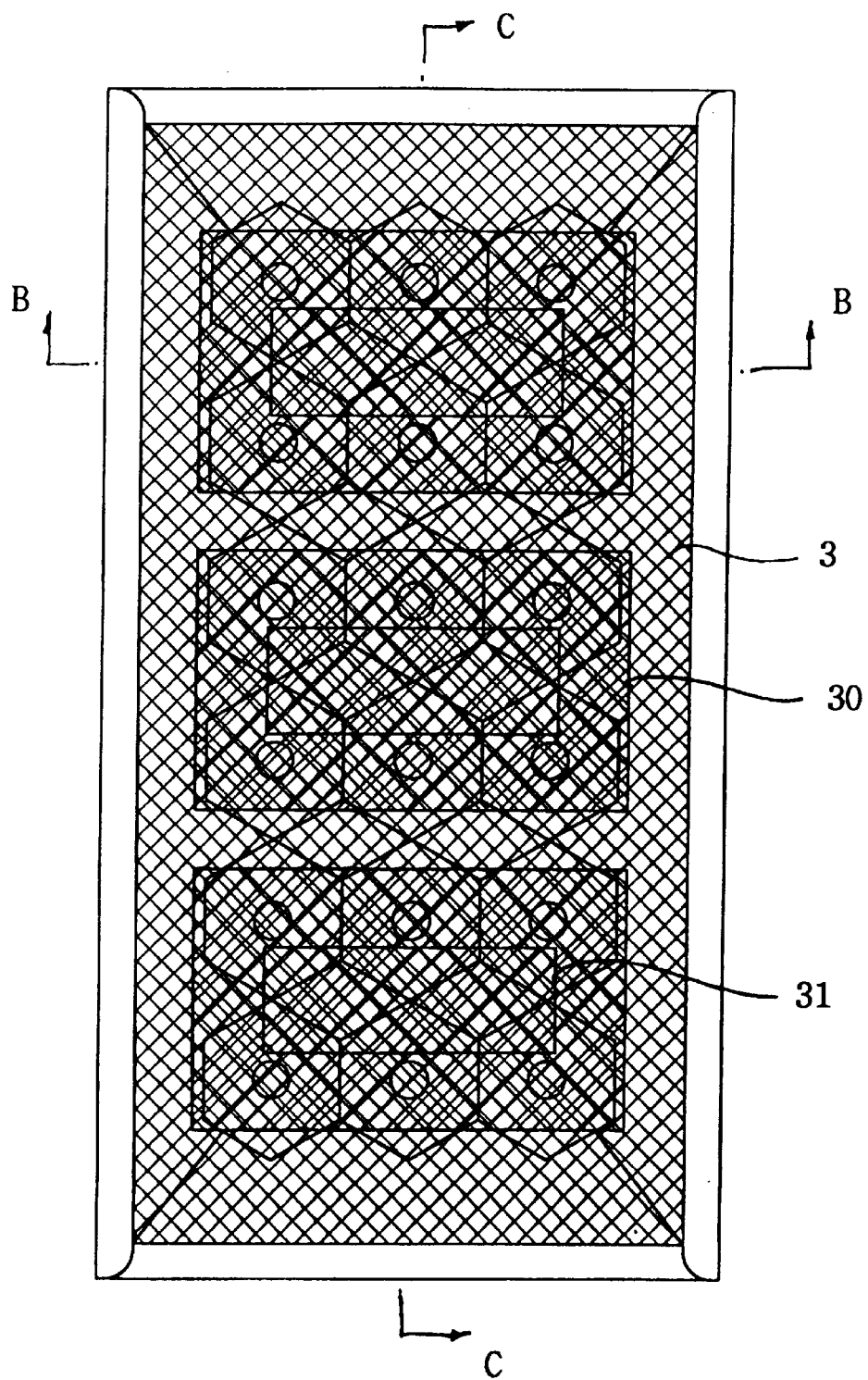
FIG. 3 is a plan view illustrating a portable charcoal-fired roaster in accordance with an embodiment of the present invention.
Figure 4:
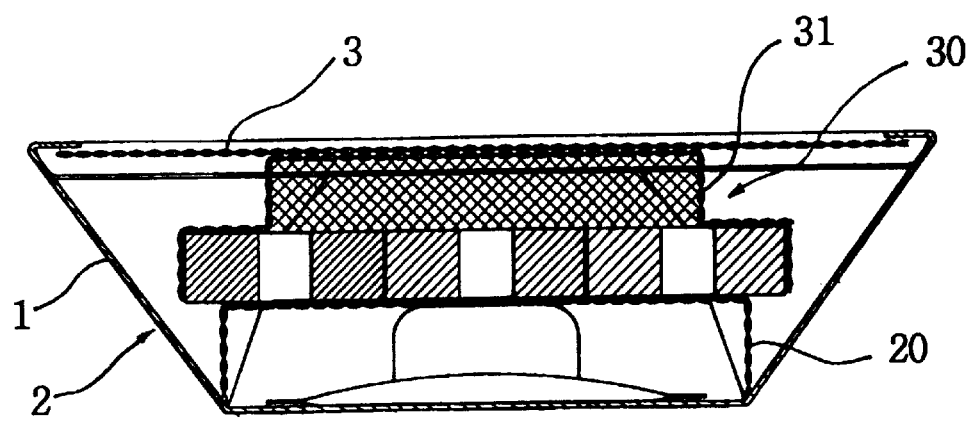
FIG. 4 is a cross-sectional view taken along the line B—B of FIG. 3.
Figure 5:
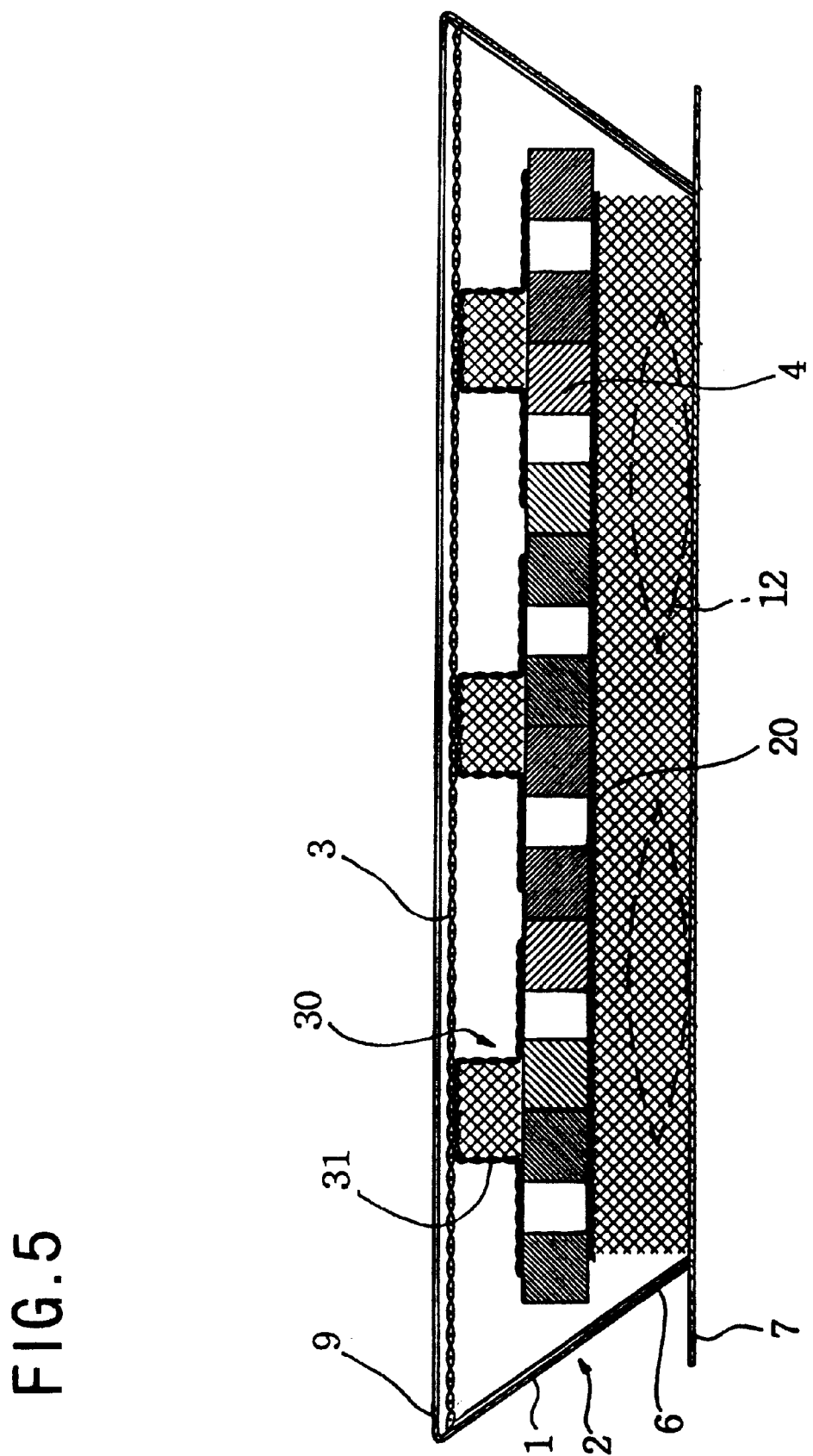
FIG. 5 is a cross-sectional view taken along the line C—C of FIG. 3.
Figure 6:
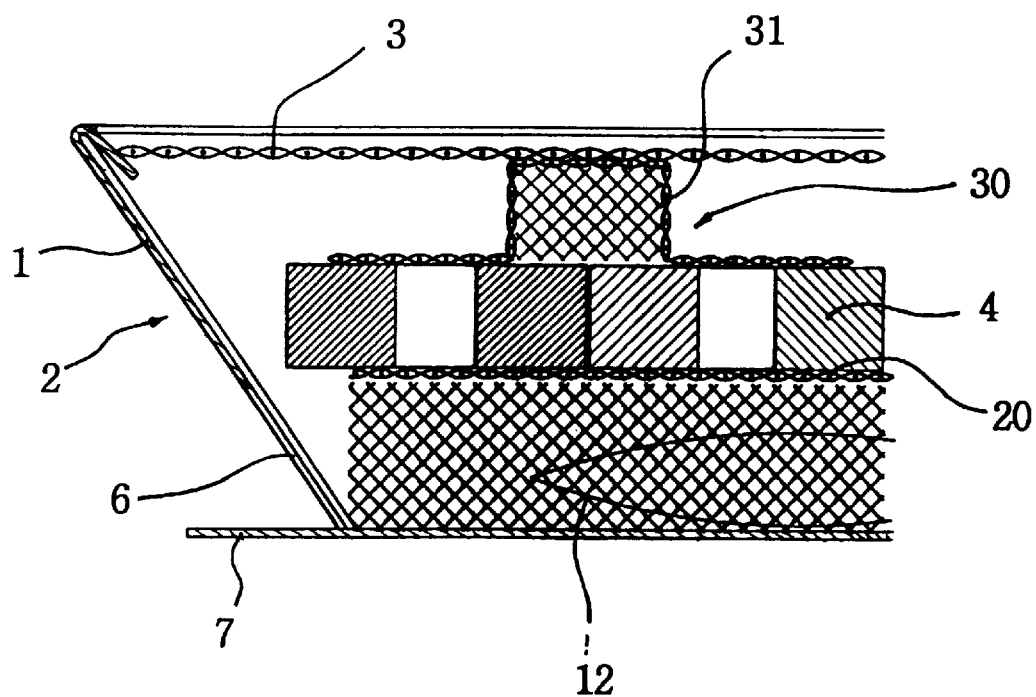
FIG. 6 is an enlarged view illustrating an essential part of the portable charcoal-fired roaster shown in FIG. 5.

FIG. 3 is a plan view illustrating a portable charcoal-fired roaster in accordance with a preferred embodiment of the present invention. FIG. 4 is a cross-sectional view taken along the line B—B of FIG. 3. FIG. 5 is a cross-sectional view taken along the line C—C of FIG. 3. FIG. 6 is an enlarged view illustrating an essential part of the portable charcoal-fired roaster shown in FIG. 5. In FIGS. 3 to 6, elements respectively corresponding to those in FIGS. 1 and 2 are denoted by the same reference numeral. As shown in FIGS. 3 to 6, the charcoal-fired roaster of the present invention includes a housing 2 having a bottom wall and an inclined side wall 1 extending upwardly from the peripheral edge of the bottom wall in such a fashion that the housing 2 has a space having an increased cross-sectional area as it extends upwardly. An inner support net 20 is received in the housing 2 to provide a seat for charcoal blocks 4 received in the housing 2 so that it supports the charcoal blocks 4 in a state suspended from the bottom of the housing 2. The inner support net 20 has an inverted U-shaped structure having a top portion and a pair of side portions. The inner support net 20 is seated on the bottom of the housing 2 at respective lower ends of the side portions thereof. By virtue of the inverted U-shaped structure of the inner support net 20, a space is defined between the bottom of the housing 2 and the upper surface of the inner support net 20 at the lower portion of the housing 2 to receive an ignition material 12. The charcoal blocks 4 are arranged in such a fashion that they are grouped into charcoal block groups spaced apart from one another. Each charcoal block group includes several charcoal blocks, for example, 6 charcoal blocks. The charcoal-fired roaster also includes a plurality of charcoal retaining nets 30 seated on the charcoal blocks 4 to retain the charcoal blocks 4 seated on the inner support net 20. Each charcoal retaining net 30 serves to retain each charcoal block group in a state spaced apart from adjacent charcoal block groups without being laterally moved. Each charcoal retaining net 30 has an upward protrusion 31 having a hollow structure. A gridiron 3 is seated on the charcoal retaining nets 30 in such a fashion that it is in contact with the upper surfaces of the upward protrusions 31. Since the upward protrusion 31 of each charcoal retaining net 30 has a hollow structure, the gridiron 3 is in elastic contact with the upward protrusions 31. The gridiron 3 is retained in position by a bending flange 9 provided at the upper end of the housing 2. In a state in which the gridiron 3 is seated on the charcoal retaining nets 30, the bending flange 9 is inwardly bent from the upper end of the inclined side wall 1 of the housing 2 in such a fashion that it engages with the peripheral edge of the gridiron 3. In FIGS. 3 to 5, the reference numeral 7 is an opening adjusting plate for adjusting the opened degree of an opening formed at the housing in order to adjust an amount of air introduced into the space, defined at the lower portion of the housing 2, through the opening.

In the case of FIGS. 3 to 5, each protrusion 31 has a laterally-elongated hollow bar structure having a small width in the longitudinal direction of the charcoal retaining net 30. However, the protrusion 31 may have other structures in so far as it has a function of supporting the gridiron 3.

Now, the assembling procedure of the above mentioned elements will be described.

First, the inner support net 20 is seated on the bottom of the housing 2 in such a fashion that its charcoal seat is suspended from the bottom of the housing 2. Thereafter, charcoal blocks 4 are seated on the inner support net 20 in such a fashion that they are grouped into several groups uniformly spaced apart from one another. The charcoal retaining nets 30 are then seated on respective groups of the charcoal blocks 4 in such a fashion that their protrusions 31 are upwardly exposed. In the case of FIG. 5, each charcoal block group includes 6 charcoal blocks arranged in two lines each including 3 charcoal blocks. Each charcoal retaining net 30 retains the associated charcoal block group so that the charcoal block group is maintained in a state spaced apart from adjacent charcoal block group. Since the charcoal blocks 4 are retained in a grouped state, the retainment of those charcoal blocks 4 can be more easily achieved. Subsequently, the gridiron 3 is seated on the charcoal retaining nets 30 in such a fashion that its lower surface comes into contact with the upper surfaces of the protrusions 31. In this state, the bending flange 9 is inwardly bent to engage with the peripheral edge of the gridiron 3, as shown in FIGS. 4 to 6. Thus, the gridiron 3 is retained in position without being separated from the housing 2. In this case, the gridiron 3 is elastically urged in an upward direction by the protrusions 31 of the charcoal retaining nets 30 having an elastic structure. In particular, this effect is more reliably provided because the protrusions 31 provide a large contact area with the gridiron 3 by virtue of its large length even though it has a small width. By virtue of such an elastic contact between the gridiron 3 and charcoal retaining nets 30, the charcoal blocks 4 are also downwardly urged against the inner support net 20, so that they are firmly retained on the inner support net 20. Also, the inner support net 20 is downwardly urged against the bottom of the housing 2 by virtue of the downward urging force applied thereto. Accordingly, all elements of the charcoal-fired roaster according to the illustrated embodiment of the present invention can be firmly coupled together and retained in position without using any coupling means. As a result, it is possible to reduce the time and the number of processes required to assemble the elements of the roaster, thereby achieving a reduction in the manufacturing costs. Moreover, there is a convenience in use because the charcoal blocks 4 are retained in position. The ignition material 12 may be placed on the bottom of the housing 2 at the beginning of the assembling procedure. Alternatively, the ignition material 12 may be placed after the completion of the assembling procedure. In the latter case, the ignition material 12 is placed on the bottom of the housing 2 by opening the opening adjusting plate 7, and then putting the ignition material 12 into the housing 2 through the opening. In use, fire is first caught by the ignition material 12, and then transferred to the charcoal blocks 4. Once fire is caught by the charcoal blocks 4, foodstuffs can be roasted on the gridiron 3.

Figure 7:
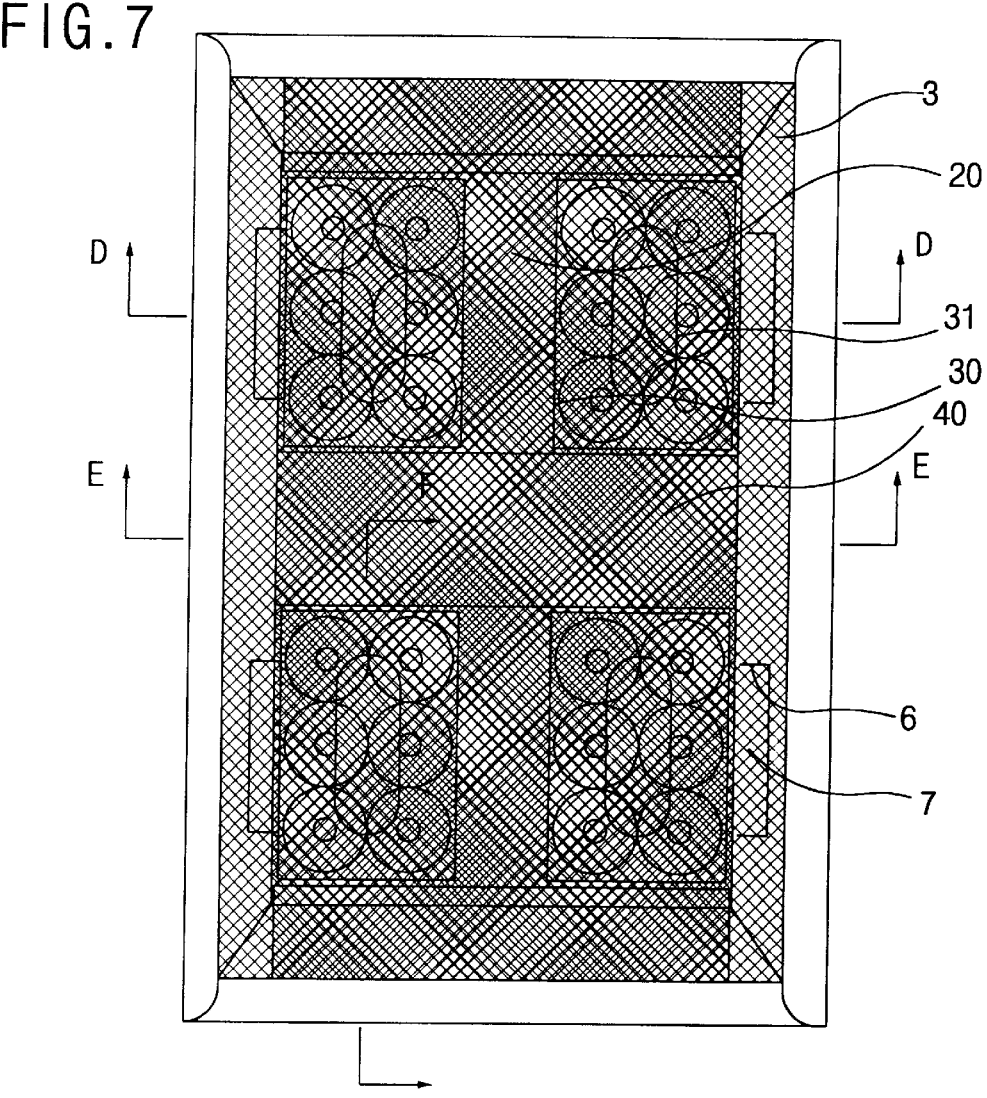
FIG. 7 is a plan view illustrating a charcoal-fired roaster in accordance with another embodiment of the present invention.

Referring to FIGS. 7 to 10, a portable charcoal-fired roaster according to another embodiment of the present invention is illustrated, respectively. The configuration of the charcoal-fired roaster shown in FIGS. 7 to 10 is partially similar to that shown in FIGS. 3 to 6. In FIGS. 7 to 10, accordingly, elements respectively corresponding to those in FIGS. 3 to 6 are denoted by the same reference numerals. FIG. 7 is a plan view illustrating the charcoal-fired roaster according to the second embodiment of the present invention. As shown in FIG. 7, the charcoal-fired roaster includes a plurality of spacer nets 40 arranged in the housing 2 while being uniformly spaced from one another in the longitudinal direction of the housing 2. In the illustrated case, the charcoal-fired roaster includes three spacer nets 40 one being a central spacer net having an inverted U-shaped structure. The remaining ones of the spacer nets 40 are two end spacer nets having a 90°-rotated L-shaped structure. The central spacer net 40 is centrally arranged in the housing 2 when viewed in the longitudinal direction of the housing 2 whereas the end spacer nets 40 are arranged at the opposite longitudinal ends of the housing 2. By these spacer nets 40, the interior of the housing 2 is divided into two separate spaces. A pair of inner support nets 20 are arranged in respective housing spaces between adjacent spacer nets 40, that is, the central spacer net and respective end spacer nets. Although not shown in FIGS. 7 to 9, an ignition material such as the ignition material 12 in the first embodiment is placed in the space defined in each inner support net 20. A pair of charcoal retaining nets 30 are seated on respective charcoal block groups laid on each inner support net 20 in such a fashion that they are spaced apart from each other in the lateral direction of the housing 2. Similar to the charcoal retaining net 30 of the first embodiment, each charcoal retaining net 30 of the second embodiment has an upward protrusion 31 having the same structure as that of the first embodiment. A gridiron 3 having the same structure as that of the first embodiment is seated on the charcoal retaining nets 30 in such a fashion that it is in contact with the protrusions 31 of the charcoal retaining nets 30.

Figure 8:
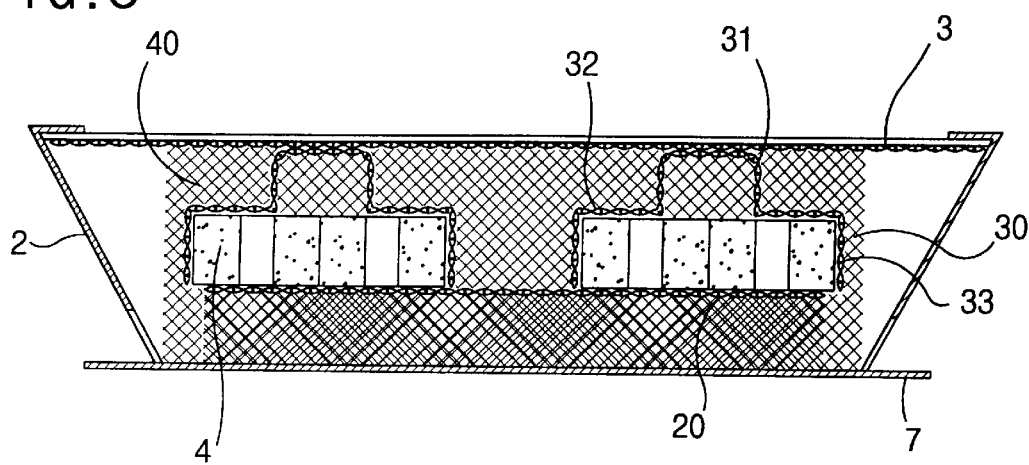
FIG. 8 is a cross-sectional view taken along the line D—D of FIG. 7.

FIG. 8 is a cross-sectional view taken along the line D—D of FIG. 7. Referring to FIG. 8, each charcoal retaining net 30 has an upper support portion 32, and a pair of lateral support portions extending downwardly from respective opposite lateral ends of the upper support portion 32. The upper support portion 32 comes into contact with the upper surface of the associated charcoal block group whereas the lateral support portions 33 of each charcoal retaining net 30 come into contact with the opposite lateral surfaces of the associated charcoal block group. As shown in FIG. 8, the protrusion 31 of each charcoal retaining net 30 is upwardly protruded from the central portion of the associated upper support portion 32.

Figure 9:
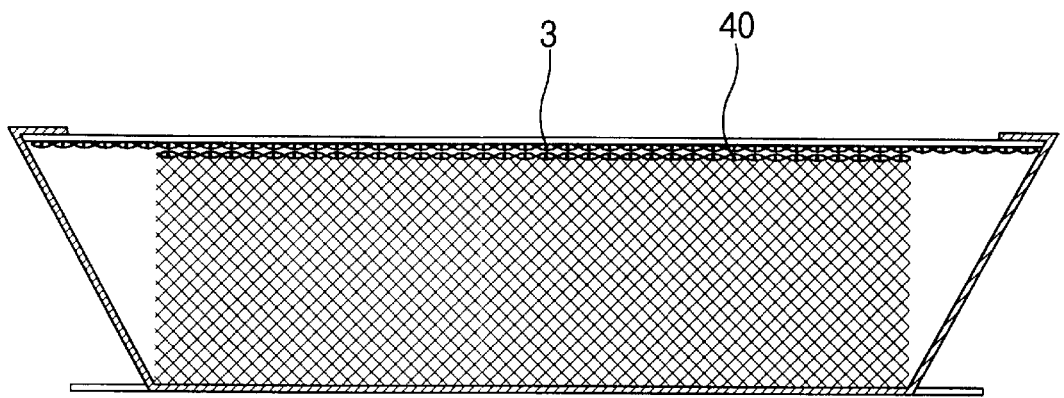
FIG. 9 is a cross-sectional view taken along the line E—E of FIG. 7.

FIG. 9 is a cross-sectional view taken along the line E—E of FIG. 7. Referring to FIG. 9, it can be found that each spacer net 40 extends throughout the width of the bottom of the housing 2 while extending upwardly to a level flush with the surface of the gridiron 3 in such a fashion that it supports the gridiron 3 at its upper surface.

Figure 10:
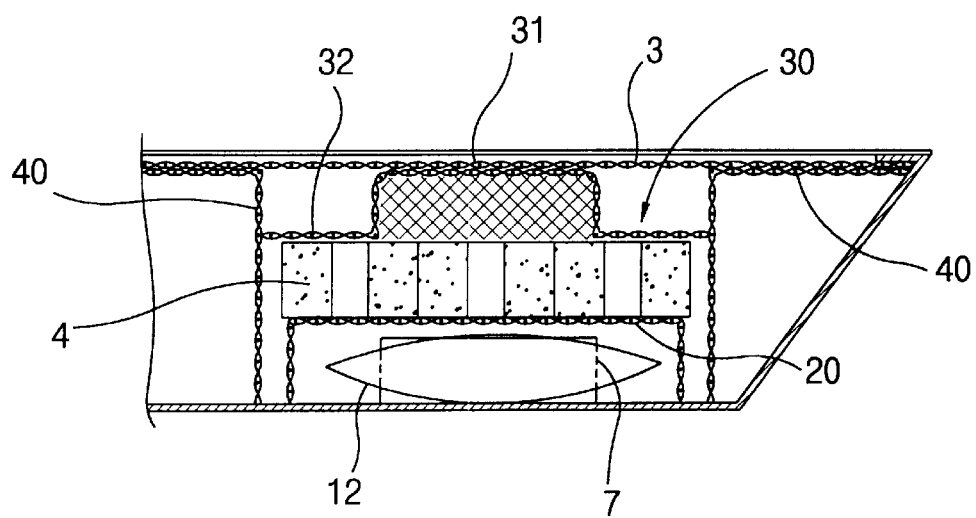
FIG. 10 is a cross-sectional view taken along the line F—F of FIG. 7.

FIG. 10 is a cross-sectional view taken along the line F—F of FIG. 7. Referring to FIG. 10, it can be found that the gridiron 3 is supported by both the spacer nets 40 and the protrusions 31 of the charcoal retaining nets 30. It can also be found that each inner support net 20 has an inverted U-shaped structure having a desired height. In FIG. 10, the reference numeral 6 denotes openings formed through the housing 2 for respective charcoal block groups. The reference numeral 7 denotes an opening adjusting plate whereas the reference numeral 12 is an ignition material.

In accordance with the second embodiment of the present invention, the spacer nets 40 serve not only to support the gridiron 3, but also to support the opposite longitudinal ends of each charcoal retaining net 30 interposed therebetween. Since the charcoal retaining nets 30 are supported between and by adjacent spacer nets 40, they can be more firmly retained in position. Accordingly, it is possible to prevent the charcoal blocks 4 from being moved. Thus, a charcoal-fired roaster having a high quality is provided.

In addition, the spacer nets 40 may serve to provide, to the gridiron 3, areas isolated from the charcoal blocks 4 because they are misaligned from positions directly over the charcoal blocks 4. When foodstuffs on the gridiron 3 begin to be burned by the flames of the charcoal blocks 4 being fired, the burning of the foodstuffs can be prevented by transferring the foodstuffs to the isolation areas of the gridiron 3 defined directly over the spacer nets 40.

Furthermore, since the charcoal blocks 4 are grouped into a plurality of isolated groups, for example, 4 groups in the illustrated case, they can be selectively used in accordance with the amount of foodstuffs to be roasted.

Figure 11:
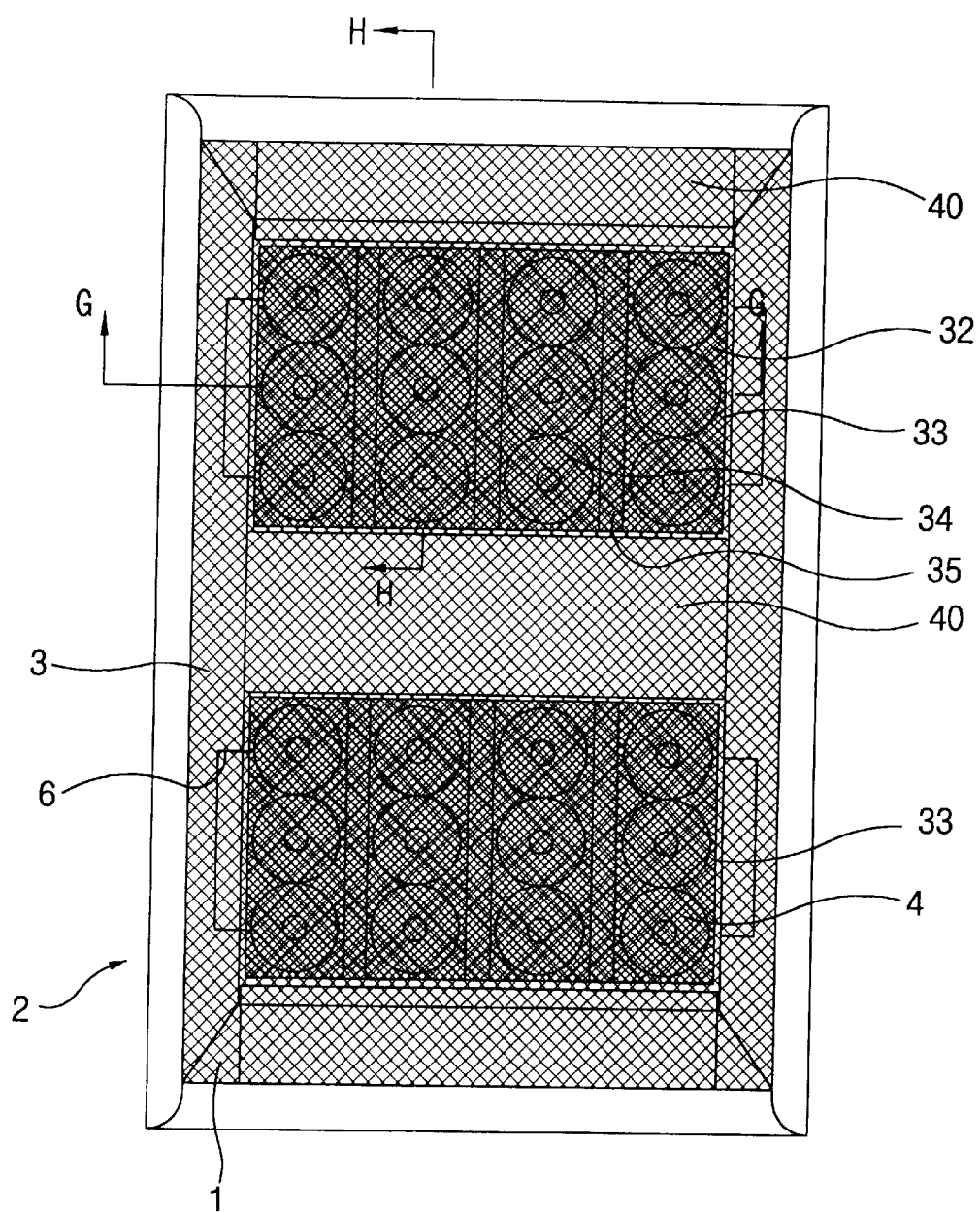
FIG. 11 is a plan view illustrating a charcoal-fired roaster in accordance with another embodiment of the present invention.

FIG. 11 is a plan view illustrating a portable charcoal-fired roaster in accordance with another embodiment of the present invention. The configuration of the charcoal-fired roaster shown in FIG. 11 is substantially similar to that shown in FIGS. 7 to 10. In FIG. 11, accordingly, elements respectively corresponding to those in FIGS. 7 to 10 are denoted by the same reference numerals. As shown in FIG. 11, in accordance with the third embodiment of the present invention, the charcoal-fired roaster includes a plurality of spacer nets 40 arranged in the housing 2 while being uniformly spaced from one another in the longitudinal direction of the housing 2. Similar to the second embodiment, the charcoal-fired roaster includes three spacer nets 40 one being a central spacer net having an inverted U-shaped structure. The remaining ones of the spacer nets 40 are two end spacer nets having a 90°-rotated L-shaped structure. The central spacer net 40 is centrally arranged in the housing 2 when viewed in the longitudinal direction of the housing 2 whereas the end spacer nets 40 are arranged at the opposite longitudinal ends of the housing 2. By these spacer nets 40, the interior of the housing 2 is divided into two separate spaces. A pair of inner support nets 20 are arranged in respective housing spaces between adjacent spacer nets 40, that is, the central spacer net and respective end spacer nets. Although not shown in FIG. 11, an ignition material such as the ignition material 12 in the second embodiment is placed in the space defined in each inner support net 20. A plurality of charcoal blocks 4 are seated on each inner support net 20 in such a fashion that they are arranged along a plurality of uniformly spaced lines. A charcoal retaining net 30 is seated on the charcoal blocks 4 laid on each inner support net 20. A gridiron 3 having the same structure as that of the second embodiment is seated on the charcoal retaining nets 30.

Figure 12:
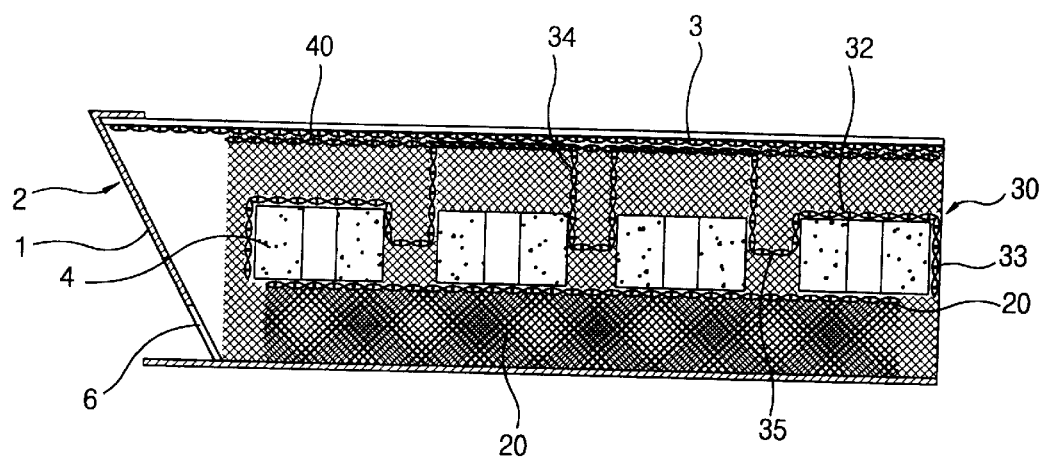
FIG. 12 is a cross-sectional view taken along the line G—G of FIG. 7.

FIG. 12 is a cross-sectional view taken along the line G—G of FIG. 11. Referring to FIG. 12, each charcoal retaining net 30 has a plurality of upper support portions 32 each seated on selected ones of the charcoal block lines laid on the associated inner support net 20, and a pair of lateral support portions extending downwardly from respective opposite lateral ends of those of the upper support portions 32 seated on the outermost ones of the charcoal block lines on the associated inner support net 20. In the illustrated case, the upper support portions 32 of each charcoal retaining net 30 are seated on the outermost charcoal block lines on the associated inner support net 20, respectively. The lateral support portions 33 of each charcoal retaining net 30 come into contact with the associated outermost charcoal block lines, respectively. Each charcoal retaining net 30 also includes a plurality of spacer portions 35 interposed between adjacent ones of the charcoal block lines on the associated inner support net 20 and adapted to space those charcoal block lines from one another. Each spacer portion 35 has a U-shaped structure extending downwardly below the upper support portions 32. In the illustrated case, each spacer portion 35 extends downwardly to an intermediate level of the charcoal blocks 4. However, this is optional in so far as each spacer portion 35 has a desired spacer function. Each spacer portion 35 further includes a plurality of protrusions 34 arranged over the remaining charcoal block lines not in contact with the upper support portions 32. Each protrusion 34 has an inverted U-shaped structure extending upwardly above the upper support portions 32 between adjacent spacer portions 35 in such a fashion that it encloses the upper portion of the associated charcoal block line while coming into contact with the gridiron 3 at the upper surface thereof.

Figure 13:
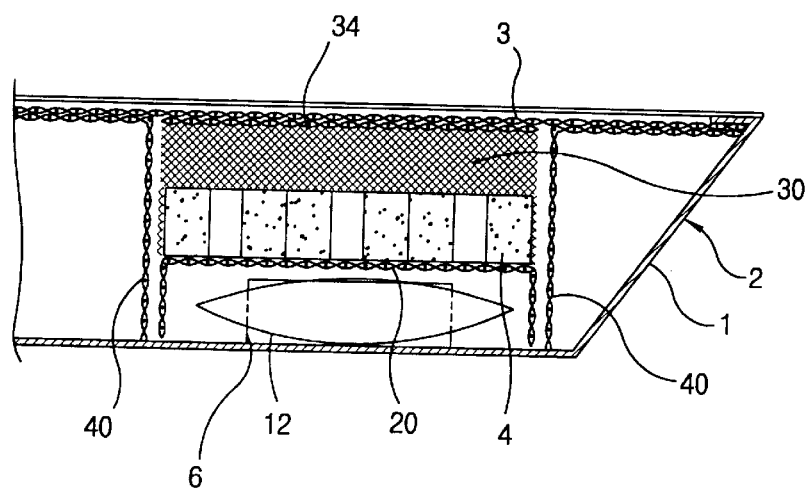
FIG. 13 is a cross-sectional view taken along the line H—H of FIG. 7.

FIG. 13 is a cross-sectional view taken along the line H—H of FIG. 11. Referring to FIG. 13, it can be found that each spacer net 40 extends throughout the width of the bottom of the housing 2 while extending upwardly to a level flush with the surface of the gridiron 3 in such a fashion that it supports the gridiron 3 at its upper surface. It can also be found that each inner support net 20 has an inverted U-shaped structure having a desired height to define therein a space for receiving an ignition material 12. As shown in FIG. 13, an opening is formed through the housing 2 for the charcoal blocks seated on each inner support net 20. Since each protrusion 34 extends upwardly in such a fashion that it comes into contact with the gridiron 3 at the upper surface thereof, it serves as a support for the weight of the gridiron 3.

In accordance with the third embodiment of the present invention, the charcoal retaining nets 30 are supported between and by adjacent spacer nets 40 while being spaced apart from each other, so that they can be more firmly retained in position. Accordingly, it is possible to prevent the charcoal blocks 4 from being moved. In particular, there is an advantage where a uniform heat supply is required. This is because the charcoal blocks 4 are arranged along a plurality of uniformly spaced lines by the spacer portions 35 of each charcoal retaining net 30. Also, the gridiron 3 is firmly held in position because it is supported by the upper surfaces of the spacer nets 40 and the upper surfaces of the protrusions 34 provided at each charcoal retaining net 30.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

As apparent from the above description, the present invention provides a portable charcoal-fired roaster including at least one inner support net and a plurality of spaced charcoal retaining nets to retain charcoal blocks therebetween while having an elastic contact structure capable of firmly coupling those inner support net and charcoal retaining nets without using any separate coupling means. Accordingly, it is possible to reduce the time and the number of processes required to assembly the elements of the roaster, thereby achieving a reduction in the manufacturing costs. In accordance with the present invention, the charcoal blocks seated on the inner support net are grouped into a plurality of spaced groups respectively adapted to be retained by the charcoal retaining nets. Accordingly, it is more surely possible to prevent a movement of the charcoal blocks. This results in a reduction in a breakage of the charcoal blocks. In accordance with the present invention, spacer nets may be provided which serve to retain inner support nets in a uniformly spaced state. In this case, the charcoal blocks 4 are grouped into a plurality of isolated groups, so that they can be selectively used in accordance with the amount of meat to be roasted.

What is claimed is:

1. A portable charcoal-fired roaster comprising:

a housing having a bottom wall and an inclined side wall extending upwardly from a peripheral edge of the bottom wall in such a fashion that the housing has a space having an increased cross-sectional area as it extends upwardly, the side wall having a bending flange at an upper end thereof;

an inner support net seated on the bottom wall of the housing and adapted to provide a seat for charcoal blocks to be received in the housing in such a fashion that it supports the charcoal blocks in a state suspended from the bottom wall of the housing, the inner support net having an inverted U-shaped structure to define a space between the bottom of the housing and the top of the inner support net for receiving an ignition material;

a plurality of charcoal retaining nets seated on the charcoal blocks laid on the inner support net to retain the charcoal blocks in such a fashion that the charcoal blocks are grouped into charcoal block groups spaced apart from one another and respectively retained by the charcoal retaining nets, each of the charcoal retain nets having a central upward protrusion with an inverted U-shaped structure; and a gridiron seated on the charcoal retaining nets in such a fashion that it is in elastic contact with respective upper surfaces of the upward protrusions provided at the charcoal retaining nets, the gridiron being retained in position by the bending flange of the housing.

2. A portable charcoal-fired roaster comprising:

a housing having a bottom wall and an inclined side wall extending upwardly from a peripheral edge of the bottom wall in such a fashion that the housing has a space having an increased cross-sectional area as it extends upwardly, the side wall having a bending flange at an upper end thereof;

a central spacer net centrally seated on the bottom wall of the housing, the central spacer net having an inverted U-shaped structure and extending upwardly to the upper end of the housing;

a pair of end spacer nets respectively seated on the bottom wall of the housing at opposite sides of the housing and spaced apart from the central spacer, each of the end spacer nets having a 90°-inverted L-shaped structure and extending upwardly to the upper end of the housing;

a pair of inner support nets seated on the bottom wall of the housing at opposite sides of the central spacer net, each of the inner support nets serving to provide a seat for charcoal blocks to be received in the housing in such a fashion that it supports the charcoal blocks in a state suspended from the bottom wall of the housing, each of the inner support nets having an inverted U-shaped structure to define a space between the bottom of the housing and the top of the inner support net for receiving an ignition material;

a plurality of charcoal retaining nets seated on the charcoal blocks laid on each of the inner support nets to retain the charcoal blocks in such a fashion that the charcoal blocks are grouped into charcoal block groups spaced apart from one another and respectively retained by the charcoal retaining nets, each of the charcoal retain nets enclosing an associated one of the charcoal block groups and having a central upward protrusion with an inverted U-shaped structure; and a gridiron seated on the charcoal retaining nets in such a fashion that it is in elastic contact with respective upper surfaces of the upward protrusions provided at the charcoal retaining nets and respective upper surfaces of the central and end spacer nets, the gridiron being retained in position by the bending flange of the housing.

3. A portable charcoal-fired roaster comprising:

a housing having a bottom wall and an inclined side wall extending upwardly from a peripheral edge of the bottom wall in such a fashion that the housing has a space having an increased cross-sectional area as it extends upwardly, the side wall having a bending flange at an upper end thereof;

a central spacer net centrally seated on the bottom wall of the housing, the central spacer net having an inverted U-shaped structure and extending upwardly to the upper end of the housing;

a pair of end spacer nets respectively seated on the bottom wall of the housing at opposite sides of the housing and spaced apart from the central spacer, each of the end spacer nets having a 90°-inverted L-shaped structure and extending upwardly to the upper end of the housing;

a pair of inner support nets seated on the bottom wall of the housing at opposite sides of the central spacer net, each of the inner support nets serving to provide a seat for charcoal blocks to be received in the housing in such a fashion that it supports the charcoal blocks in a state suspended from the bottom wall of the housing, each of the inner support nets having an inverted U-shaped structure to define a space between the bottom of the housing and the top of the inner support net for receiving an ignition material;

a pair of charcoal retaining nets each seated on the charcoal blocks laid on an associated one of the inner support nets to retain the charcoal blocks in such a fashion that the charcoal blocks on the associated inner support net are grouped into charcoal block lines spaced apart from one another and retained by the charcoal retaining net, each of the charcoal retain nets, each of the charcoal retaining nets having a plurality of upper support portions each seated on selected ones of the charcoal block lines laid on an associated one of the inner support nets, a pair of lateral support portions extending downwardly from respective opposite lateral ends of those of the upper support portions seated on the outermost ones of the charcoal block lines on the associated inner support net, the lateral support portions being in contact with the outermost charcoal block lines, respectively, a plurality of spacer portions interposed between adjacent ones of the charcoal block lines on the associated inner support net and adapted to space the charcoal block lines from one another, each of the spacer portions having a U-shaped structure extending downwardly below the upper support portions, and a plurality of protrusion arranged over the remaining ones of the charcoal block lines not in contact with the upper support portions, each of the protrusions having an inverted U-shaped structure extending upwardly to the upper end of the housing between adjacent ones of the spacer portions in such a fashion that it encloses the upper portion of an associated one of the charcoal block lines; and a gridiron seated on the charcoal retaining nets in such a fashion that it is in elastic contact with respective upper surfaces of the upward protrusions provided at the charcoal retaining nets and respective upper surfaces of the central and end spacer nets, the gridiron being retained in position by the bending flange of the housing.

* * * * *